United States Patent
Leta et al.

[11] Patent Number: 5,943,406
[45] Date of Patent: Aug. 24, 1999

[54] TELEPHONE CALL TRACKING AND BILLING SYSTEM AND METHOD

[76] Inventors: John T. Leta; Paul J. Mortilla, both of 1816 SW. Seventh Ave., Pompano Beach, Fla. 33060

[21] Appl. No.: 08/941,866

[22] Filed: Sep. 30, 1997

[51] Int. Cl.⁶ .................................................. H04M 15/00
[52] U.S. Cl. ........................ 379/120; 379/111; 379/114; 379/119; 379/135
[58] Field of Search ..................... 379/111, 112, 379/114, 116, 119, 120, 144, 199, 202, 203, 204, 205, 206, 118, 135

[56] References Cited

U.S. PATENT DOCUMENTS

| | | |
|---|---|---|
| 3,767,862 | 10/1973 | Grushow . |
| 3,943,526 | 3/1976 | Albertini et al. . |
| 4,122,308 | 10/1978 | Weinberger et al. . |
| 4,195,220 | 3/1980 | Bristol et al. . |
| 4,264,956 | 4/1981 | Delaney . |
| 4,461,928 | 7/1984 | Hashimoto . |
| 4,585,904 | 4/1986 | Mincone et al. . |
| 4,751,728 | 6/1988 | Treat ........................................ 379/113 |
| 4,813,065 | 3/1989 | Segala ...................................... 379/112 |
| 4,890,317 | 12/1989 | Hird et al. ............................... 379/132 |
| 4,935,956 | 6/1990 | Hellwarth et al. ....................... 379/112 |
| 5,077,682 | 12/1991 | Kim ......................................... 364/569 |
| 5,148,474 | 9/1992 | Haralambopoulos .................... 379/111 |
| 5,187,710 | 2/1993 | Chau et al. .............................. 379/114 |
| 5,276,441 | 1/1994 | Katsurada et al. ...................... 379/119 |
| 5,559,872 | 9/1996 | Van Huyssteen ....................... 379/130 |
| 5,841,847 | 11/1998 | Graham et al. .......................... 379/116 |

*Primary Examiner*—Paul Loomis
*Assistant Examiner*—Binh K. Tieu
*Attorney, Agent, or Firm*—Malloy & Malloy, P.A.

[57] ABSTRACT

A telephone call tracking and billing system and method in which a subscriber can call a central system location, enter personal identification and billing code information, and then place a desired call is provided. The call duration can be logged and stored along with the billing code information. Monthly billing statements can be generated and provided to the subscriber, and custom reports can be generated and delivered at any time according to the subscriber's requests. The system is maintained at the provider's site so that the subscriber need not purchase or maintain hardware and software.

27 Claims, 6 Drawing Sheets

FIG. 4

Billing Detail for: Gold Coast Telecom, Inc.
From: 06/01/97 To: 08/01/97

| Client | Call Time | User | Reason Code | Number | Hours | Telecom Minutes | Total Charges |
|---|---|---|---|---|---|---|---|
| 4321 | 6/19/97 10:06:02 PM | Paula Mortilla | 14 Negotiations | 15619947116 | 0.4 | 15.0 | $74.70 |
| | 6/19/97 10:06:46 PM | Paula Mortilla | 14 Negotiations | 19545551212 | 0.4 | 16.0 | $74.88 |
| | 6/20/97 7:42:13 AM | Paula Mortilla | 14 Negotiations | 15619947116 | 0.2 | 6.0 | $37.08 |
| | 6/21/97 11:36:27 AM | Paula Mortilla | 11 Fax | 19549172811 | 0.4 | 9.0 | $73.62 |
| | 6/21/97 3:28:29 PM | Paula Mortilla | 11 Fax | 19547491618 | 0.2 | 3.0 | $72.54 |
| | 6/21/97 3:32:54 PM | Paula Mortilla | 14 Negotiations | 19549172811 | 0.2 | 7.0 | $37.26 |
| | 6/24/97 11:15:30 AM | John Leta | 12 Client Call Back | 19547302983 | 0.3 | 12.0 | $68.16 |
| | 6/24/97 11:57:45 AM | John Leta | 14 Negotiations | 19549172811 | 0.4 | 14.0 | $90.52 |
| | 6/24/97 3:34:44 PM | John Leta | 14 Negotiations | 19547302983 | 0.4 | 13.0 | $90.34 |
| | 6/26/97 4:12:59 PM | John Leta | 15 Fax | 19549436226 | 0.1 | 5.0 | $22.90 |
| | 6/26/97 4:13:54 PM | John Leta | 12 Client Call Back | 19543968261 | 0.3 | 15.0 | $68.70 |
| | 7/5/97 11:36:16 AM | Paul Mortilla | 14 Negotiations | 19547356597 | 0.4 | 21.0 | $75.78 |
| | 7/5/97 11:58:21 AM | Paul Mortilla | 12 Client Call Back | 19549172611 | 0.3 | 13.0 | $56.34 |
| | 7/5/97 7:43:57 PM | Paul Mortilla | 14 Negotiations | 19547356597 | 0.2 | 5.0 | $36.90 |
| | 7/7/97 5:28:03 PM | John Leta | 14 Negotiations | 19549172811 | 0.2 | 8.0 | $45.44 |
| | 7/11/97 1:31:52 PM | John Leta | 15 Fax | 19549172811 | 0.2 | 7.0 | $45.26 |
| | 7/11/97 2:13:42 PM | John Leta | 14 Negotiations | 19549172811 | 0.2 | 6.0 | $45.08 |

Summary for Client 4321 (17 detail records)

Client Total 5.0 175.0 $1,015.50

FIG. 5-1

Invoice Detail for ABC Professional Services, Inc.
From: 07/01/97 To: 07/15/97

User: John Leta

| Call Connect | Client | Reason Code | Number Dialed | Minutes | Charges |
|---|---|---|---|---|---|
| 7/1/97 8:43:55 PM | 1234 | 12 Client Call Back | 19547497380 | 11 | $2.86 |
| 7/2/97 12:22:39 PM | 1234 | 11 Court House | 17136261661 | 6 | $1.56 |
| 7/3/97 9:51:33 AM | 1234 | 12 Client Call Back | 19547302983 | 9 | $2.34 |
| 7/3/97 10:00:21 AM | 1234 | 11 Court House | 19547302983 | 9 | $2.34 |
| 7/3/97 8:02:26 PM | 1234 | 15 Fax | 17166629970 | 11 | $2.86 |
| 7/3/97 9:25:30 PM | 1234 | 11 Court House | 19547302983 | 23 | $5.96 |
| 7/4/97 8:10:53 AM | 1234 | 12 Client Call Back | 15613944060 | 11 | $2.86 |
| 7/4/97 9:00:37 AM | 1234 | 15 Fax | 17166824858 | 21 | $5.46 |
| 7/7/97 5:28:03 PM | 4321 | 14 Negotiations | 19549172811 | 8 | $2.08 |
| 7/7/97 8:08:21 PM | 1234 | 11 Court House | 15088623000 | 11 | $2.86 |
| 7/8/97 6:18:26 PM | 1234 | 14 Negotiations | 17706677800 | 133 | $34.58 |
| 7/8/97 9:12:24 PM | 1234 | 12 Client Call Back | 19548900664 | 12 | $3.12 |
| 7/8/97 9:20:52 AM | 1234 | 12 Client Call Back | 17169997890 | 6 | $1.56 |
| 7/9/97 3:12:47 PM | 1234 | 15 Fax | 19547302983 | 8 | $2.06 |
| 7/11/97 1:31:52 PM | 4321 | 15 Fax | 19549172811 | 7 | $1.82 |
| 7/11/97 2:13:42 PM | 4321 | 14 Negotiations | 19549172811 | 6 | $1.56 |

Summary for User John Leta (16 call detail records)

User Total　　　　　　　　　　　　　　　　　　　　　292　　$75.92

FIG. 5-2

User: Paul Mortilla

| Call Connect | Client | Reason Code | Number Dialed | Minutes | Charges |
|---|---|---|---|---|---|
| 7/5/97 11:36:16 AM | 4321 | 14 Negotiations | 19547358597 | 21 | $5.46 |
| 7/5/97 11:56:21 AM | 4321 | 12 Client Call Back | 19549172811 | 13 | $3.38 |
| 7/5/97 7:43:57 PM | 4321 | 14 Negotiations | 19547356597 | 5 | $1.30 |

Summary for User Paul Mortilla (3 call detail records)

User Total      39      $10.14

Invoice Total (19 call detail records)      331      $86.06

TELEPHONE CALL TRACKING AND BILLING SYSTEM AND METHOD

BACKGROUND OF THE INVENTION

1. Field of the Invention

This invention relates to a telephone call tracking and billing system and method, and more particularly to a system and method in which a subscriber calls a central location, enters identification and billing code information, and then places a desired call which will be logged according to preselected criteria. Reports and billing statements can subsequently be generated and provided to the subscriber.

2. Description of Related Art

Accounting for time spent on the telephone for various clients is important to professional practices, businesses, and others, especially if clients are billed for the time spent working on the client's matters. Much of the professional's time spent working on client matters over the telephone may not be recorded, and hence the professional's time is not being adequately accounted for.

Telephone time recording and accounting systems are known in the art. U.S. Pat. No. 3,943,526 (the '526 patent) discloses a timekeeping and accounting unit which keeps track of the user's work activity. The user pushes pushbutton switches to identify the client and work activity, and a start pushbutton to start recording time. A stop pushbutton is pressed when the work is complete, and the time spent on that particular activity is recorded.

When a call is received, the time being recorded for the interrupted work activity is stopped by pushing a telephone interrupt pushbutton. The duration of the incoming call is recorded, and can be identified for billing purposes by pushing pushbuttons to identify the client. At the end of the telephone call the user must push the end pushbutton to make a record of the duration of time spent with the interrupting client. The recorded data is printed on a paper tape.

The system disclosed in the '526 patent is directed at keeping track of incoming calls that interrupt work in progress. The system requires the user to depress switches, and input client information for billing, each time a call is received. The device of the '526 patent does not disclose use for outgoing calls. Even if the device could be used for outgoing calls, the operation of the device requires constant input from the user in the manner of pushing various pushbuttons to input client data, and to start and stop recording time. The user could conceivably utilize a stopwatch and a notebook to record the same information that is printed on the paper tape output without requiring any additional effort. The level of effort required can cause the user to forget, or to just stop using, the system.

U.S Pat. No. 5,559,872 discloses a telephone time recording system that records the opening portion of a telephone conversation along with the total call duration. The call duration is recorded as synthesized speech along with the opening portion of the conversation. The recording can be played back for correlation of the subject matter of the call and the call duration for billing purposes. Disregarding whether recording even a portion of a client's conversation is wise, the device of the '872 patent requires the user to play back the recording and to manually correlate the voices to people, and the people to a particular matter. As in the '526 patent, the system of the '872 patent requires a high level of effort by the user.

There are also various devices in the known art that are used to provide value-added services to user calls, and to provide the user with call cost metering to give the user the costs of various telephone calls. However, there is nothing known in the art that provides the features of the present invention as described herein below.

SUMMARY OF THE INVENTION

The present invention provides a telephone call tracking and billing system and method in which a subscriber calls a central system location, enters personal identification and billing code information, and then places a desired call. The call duration can be logged and stored along with the billing code information. Monthly billing statements can be generated and provided to the subscriber, and custom reports can be generated and delivered at any time according to the subscriber's requests.

In one embodiment, the system does not require the subscriber to have, purchase, or maintain any system hardware or software. The system hardware and software can be located and maintained at a provider's site. Calls to the central system can originate from anywhere, and from any type of telephone or communication equipment including home and office phones, cell phones, pay phones, fax/modem, and the internet. The system can be accessed from anywhere in the world.

In one embodiment, the central system is initially called and a subscriber's personal identification number (PIN) is requested. The subscriber inputs data in response to a series of system prompts. Once the PIN number is entered and verified, the user enters specific billing code information that can, for example, identify the client and the matter. The user can instruct the system to customize the data that will be captured. The system will subsequently prompt the user for input based upon the user's preselected customized data criteria. The customized data, or documentation information criteria, can be changed to accommodate the user. Once familiar with the system, the user can enter data quickly without waiting for system prompts.

The user is next prompted to input the number to be called and is connected. The call can be placed to any telephone answering device anywhere in the world. The subscriber can use a speed dialer to connect through the system to a "hot list" of specific clients. The call can include any communications link including voice, modem, facsimile, or connection to the internet.

The system can log the customized client information including the telephone call duration and any telephone connection charges. Custom reports can be generated and delivered at any time upon user request. Monthly billing statements can be automatically generated and mailed, faxed, or otherwise transmitted.

Accordingly, it is an object of the present invention to provide a telephone call tracing and billing system and method to automatically keep track of call duration and costs for desired calls.

It is a further object of the present invention to provide a telephone call tracking and billing system and method that records customized predetermined documentation information along with call duration and costs.

It is another object of the present invention to provide a telephone call tracking and billing system and method that provides customized reports upon demand.

It is still a further object of the present invention to provide a telephone call tracking and billing system and method maintained at a site that does not require the subscriber to purchase or maintain hardware or software.

It is yet another object of the present invention to provide a telephone call tracking and billing system and method that is compatible with any type of telephone or communications equipment.

In accordance with these and other objects which will become apparent hereinafter, the instant invention will now be described with particular reference to the accompanying drawings.

BRIEF DESCRIPTION OF THE DRAWINGS

FIG. 4 is an example of a custom report of the embodiment of FIG. 1.

FIG. 5 is an example of a custom report of the embodiment of FIG. 1.

DESCRIPTION OF THE PREFERRED EMBODIMENTS

Figure 1:
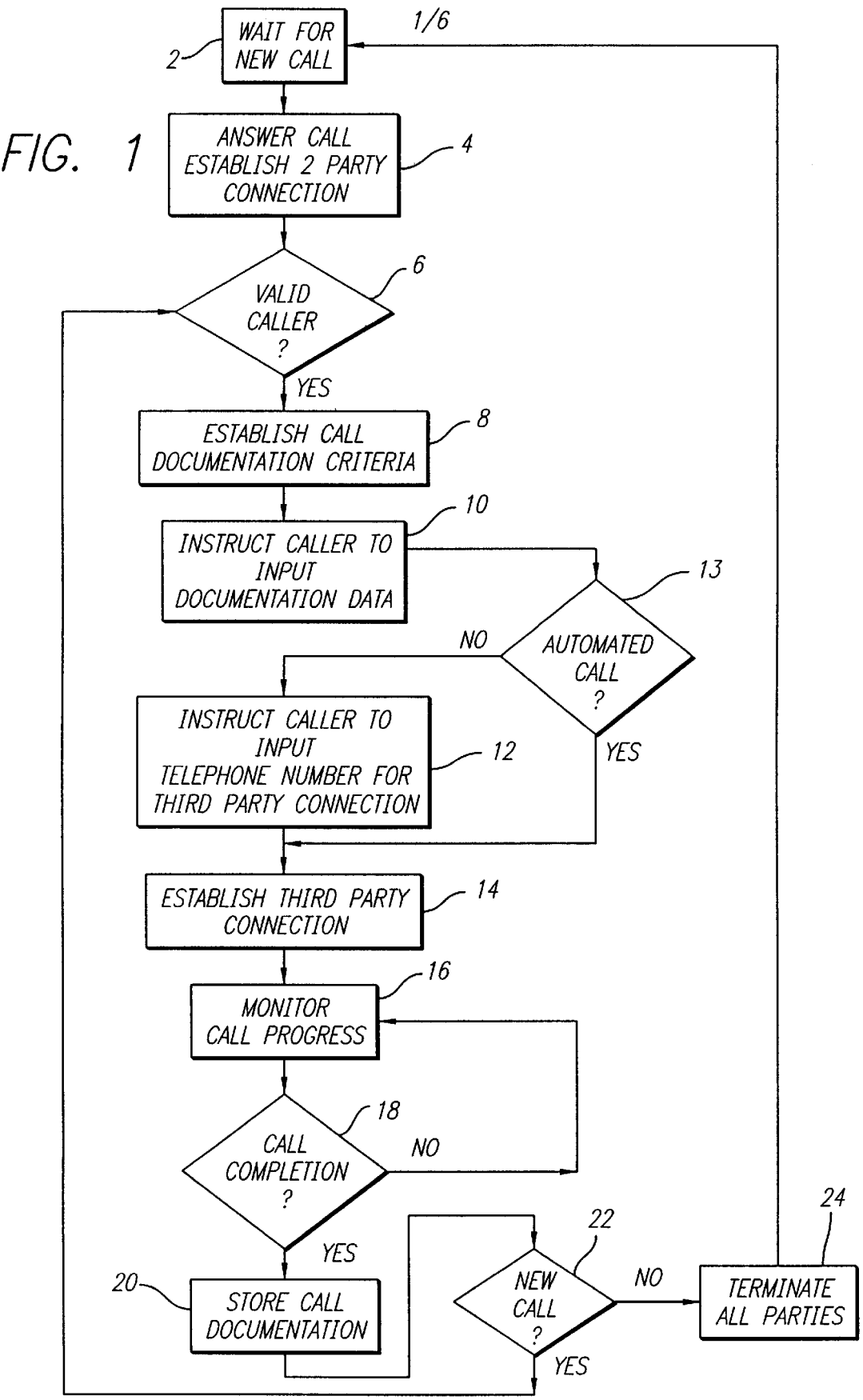
FIG. 1 is flow diagram of one embodiment of the present invention.

Referring to FIG. 1, a flowchart of one embodiment of the present invention is illustrated. The system can include hardware and software located at a service provider's site. The service provider operates and maintains the system. Users can subscribe with the service provider to utilize the features of the invention as described herein. "User" and "subscriber" are used synonymously herein.

The system initially is at idle waiting for a new call 2. When a subscriber dials the system's access number, the system answers the incoming call and establishes a two-party connection with the subscriber 4. The call to the system can be placed from anywhere in the world on any type of telephone, such as a cell phone, or from a computer, such as through the internet.

In one embodiment, the system can prompt the user to input a preassigned personal identification number (PIN) which the system compares with a valid list of PINs to establish that the caller is a valid subscriber 6. The PIN is assigned to the user upon initial subscription with the service provider that operates and maintains the system.

Once the system verifies that the caller is a valid subscriber 6, the system can access stored documentation criteria 8. "Documentation criteria" is the preselected customized set of parameters that are of importance to a user of the system. The documentation criteria is preselected by the user at initial activation, and can consist of the customized data that the user desires to be recorded or logged by the system. For example, the documentation criteria may be client file or account number, matter number or reason for call, and a responsible person's or timekeeper's identification number. The preselected documentation criteria for a user would be stored by the system and utilized each time the user calls, unless changed by user request.

Each time the subscriber calls the system and inputs the PIN number, the preselected documentation criteria can be accessed by the system 8. The system can then prompt the user to input the required documentation data 10 corresponding to the preselected documentation criteria 8. For the example given above, the documentation data which the user would input is the client's file number, the matter number, and the responsible person's identification number.

In one embodiment, the system can instruct the user to input the telephone number of the party that the user desires to call 12. The system will then establish a third-party connection 14 with the desired telephone number.

The call can be a conventional voice telephone call, and can be placed to anywhere in the world. Alternately, the call can be a facsimile transmission, or computer connection to another computer, or to the internet.

In an alternate embodiment, the user may call from an automated telephone such as a preprogrammed "store and forward system" or a PBX system. The user calling from an automated telephone system will simply dial the desired number that the user wishes to call. The automated phone system will store the desired phone number, dial the access number for the provider's site, and automatically transfer or forward the desired phone number.

As in the first embodiment discussed herein above, the system will verify 6 that the user is a valid caller, access 8 the preselected documentation criteria, prompt 10 the user for the documentation data, and establish 14 the third-party connection. However, because the desired number has been automatically entered by the user's automated telephone system, the present invention will bypass prompting the user to input the desired number 13.

In another embodiment, a user can call a telephone carrier that provides a similar store and forward service. The user would dial the carrier access number and input the desired number to be called. The carrier stores the desired number to be called, calls the access number for the present invention, and forwards the desired number to be called. The system will then verify that the user is a valid caller 6, access the preselected documentation criteria 8, prompt the user for the documentation data 10, and establish the third-party connection 14.

The user may call the system access number from a computer modem directly, or through the internet, and provide the desired number to be called, identify the caller, and provide the required documentation data 10. The desired phone number and/or documentation data can be provided to the system manually by the user or automatically by computer link. The system will establish the third-party connection 14, which may be a computer-to-computer connection. Computer-to-computer connections includes connections between facsimile machines providing the capability to send and document facsimiles using the present invention.

Regardless of how, or from what type of equipment, the user calls the system, the system can monitor the call at a preselected interval 16, such as every 30 seconds. When the system determines 18 that the call is complete, the system stores 20 the documentation criteria data, along with the call duration and any telephone connection charges.

The user can prompt 22 the system to place another call if desired, and, if yes, the sequence described hereinabove is repeated and the user will be prompted to input the new documentation data 10. The user can instruct the system to make a new call and terminate the previous call, or alternately to connect to another party or parties and maintain the previous connection or connections. Conference calls can therefore easily be made, and documented. If the user does not want to place another call 22, the connection to all parties is terminated 24, and the system returns to idle 2 to wait for a new call.

Figure 2:
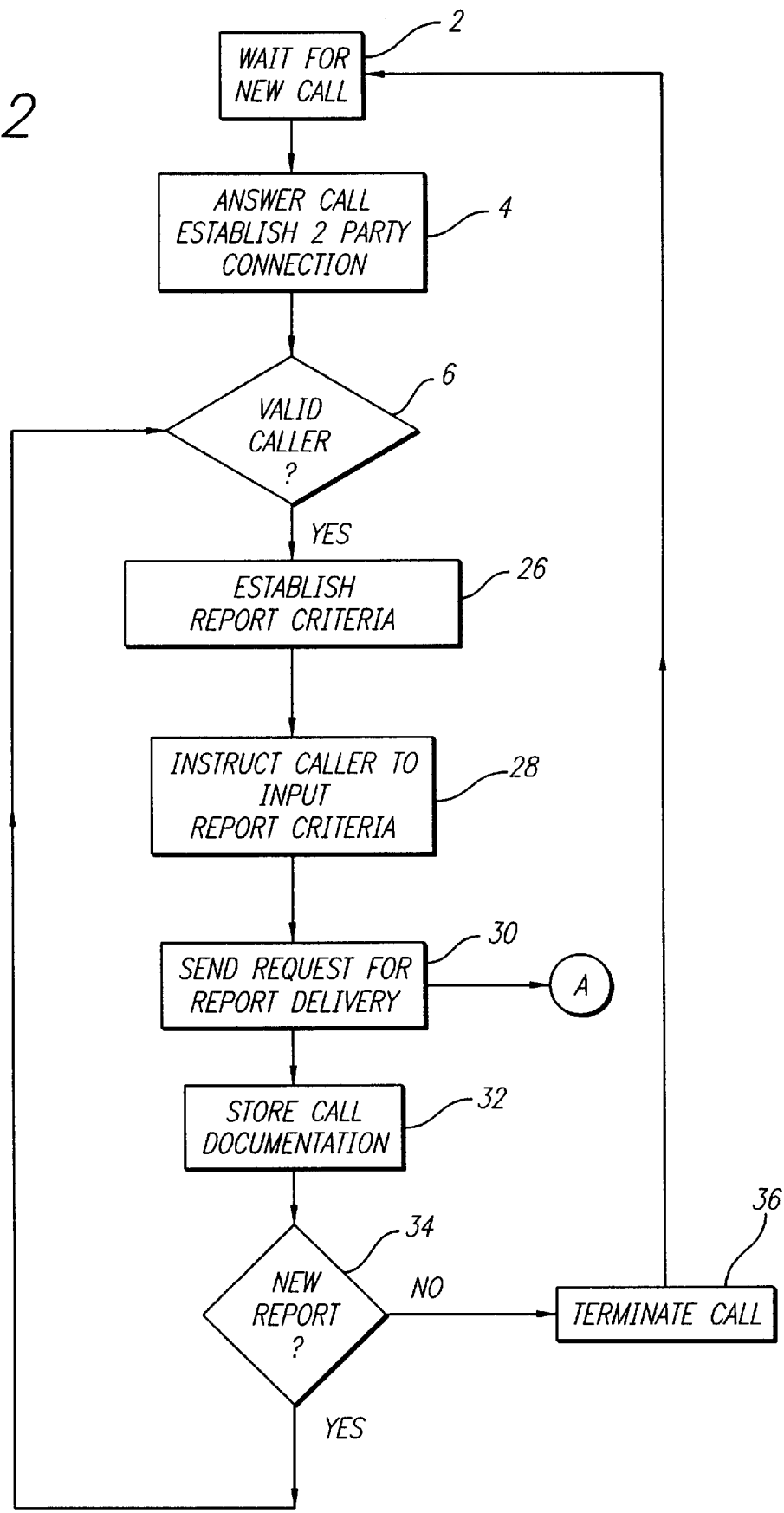
FIG. 2 is a flow diagram of one embodiment of a custom report request for the embodiment of FIG. 1.

Referring to FIG. 2, the system can respond to user requests for complete or partial reports at any time. As described hereinabove, the system is initially at idle waiting for a call 2, answers a call 4, and establishes 6 that the caller is a valid user. The user can instruct the system to place a call, or can request a report. If the user is placing a call, the description hereinabove and in FIG. 1 is followed. If the user requests a report, the system accesses stored report criteria 26.

The stored report criteria 26 is preselected by the user in much the same manner as the documentation criteria is established as described hereinabove. The report criteria can be the same criteria as stored for documentation criteria above. In the example herein, client file number, matter number, and responsible person can be preselected. However, the user may desire the report criteria to include less than, more than, or different criteria than, that utilized to document the call. For example, the user may not want the responsible party to be included in the report. Whatever criteria is preselected by the user will be recalled and utilized by the system 26 until changed by the user.

The system can then prompt the user to input report data 28, such as the date range for the report. The system can also permit the user to customize the report by adding or deleting report criteria. The system then sends a report delivery request 30, and documents 32 the report request. Documenting 32 the report request, permits the system provider to keep track of user requests for reports, and the capability to charge the user for the reports.

If a new report is desired 34, the system repeats the above process, and prompts 28 the user for report data. If no new report is desired 34, the system terminates the call 36.

Figure 3:
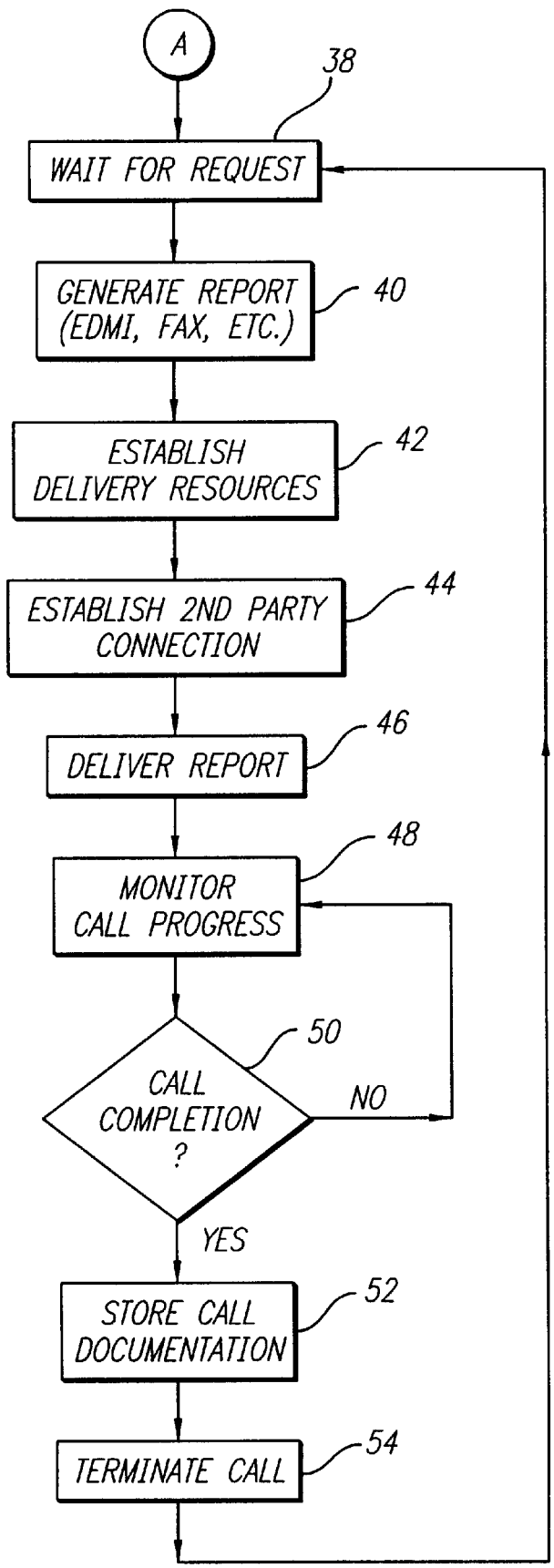
FIG. 3 is a flow diagram of one embodiment of a custom report delivery for the embodiment of FIG. 1.

Referring to FIG. 3, when the system receives a request for report delivery 38, a subsystem or module of the system generates the report 40 in a preselected format. The report can be generated as a printed report, facsimile, electronic file for modem, or internet transmission, as preselected by the user 42.

The system can automatically connect for electronic transfers 44, and deliver the report 46. For mail delivery, these steps can be completed by a mail room operator, and the system can provide instructions to the mail room operator for proper mailing of the report. For transmission, the system can monitor the call 48 at a preselected rate. Upon completion 50, the system can document the report delivery 52, and terminate the call 54.

The report delivery documentation 52, provides the provider a record of report delivery. The provider can utilize the report delivery record for charging the user fees for report delivery. The provider may choose to charge the user separately for report requests and report deliveries, or can charge for one or the other, as desired by the provider.

The system can automatically provide a periodic billing statement to the subscriber summarizing a specific period of calls, such as monthly. The statement can be printed and mailed, or sent via facsimile, modem, the internet, or other preselected manner according to the requirements of the user. The statement can include a summary of the preselected documentation criteria for each call made by the user along with the telephone call duration and any long distance charges, and other pertinent information as desired by the user. The statement can also include the service providers charges for the custom reports as described hereinabove.

Referring to FIG. 4, a sample custom report is illustrated for a two month period. The hypothetical criteria selected by the subscriber (Gold Coast Telecom, Inc.) includes, from left to right, the client number, call time, user (responsible party), reason code, telephone number, hours, telephone call duration, and total charges. In this example, the "hours" column represents a user or responsible party billing amount for the matter corresponding to the reason code for the call. The total charges column can include any long distance telephone charges associated with the telephone call.

The example illustrated in FIG. 4 can be altered in any custom manner by the subscriber. For example, the total charges column can be separated into two columns, one showing the telephone charges, and a second showing the hourly billing totals for the matter corresponding to the reason codes.

Referring to FIG. 5, an alternate example of a custom report is illustrated for the fictitious subscriber "ABC Professional Services, Inc.", for a fifteen day period and by the responsible party. In the example of FIG. 5, the report includes, from left to right, the call connect time, client number, reason code, number called, call duration, and total charges, for each user or responsible party (John Leta and Paul Mortilla).

As demonstrated by the example reports of FIGS. 4 and 5, the reports on demand can be customized according to the desires of each individual subscriber. In addition, each subscriber can request alternate reports as suited for specific customers.

The instant invention has been shown and described herein in what is considered to be the most practical and preferred embodiment. It is recognized, however, that departures may be made therefrom within the scope of the invention and that obvious modifications will occur to a person skilled in the art.

What is claimed is:

1. A telephone call tracking and billing reporting system, comprising:

means for answering an incoming call and thereby establishing a two-party connection with a caller;

means for verifying that the caller is a valid user;

means for recalling stored reported criteria preselected by said valid user, in response to a first report request received from said user;

means for receiving first report data from said user corresponding to said preselected report criteria;

means for requesting a first report delivery to said user;

means for storing said preselected report criteria and said first report data;

means for terminating the incoming call;

means for receiving said request for said first report delivery to said user;

means to generate a report in a preselected format;

means to recall a preselected telephone number for report delivery from said user;

means to establish a connection with said telephone number for report delivery;

means to transmit said report via said telephone number for report delivery;

means to monitor the connection with said telephone number for report delivery; and means to document report delivery when finished transmitting said report and means to terminate said call.

2. The system of claim 1 further including means for receiving a second report request from said user and means for terminating the incoming call if no second report request is desired by said user.

3. The system of claim 1 wherein said means for verifying that the caller is a valid user includes comparing and matching a user personal identification number with a stored list of valid personal identification numbers.

4. The system of claim 1 wherein said preselected format is a printed medium.

5. The system of claim 1 wherein said preselected format is an electronic file for transmission.

6. The system of claim 5 wherein said means for transmission includes a modem.

7. The system of claim 6 wherein said means for transmission further includes via the internet.

8. The system of claim 5 wherein said means for transmission further includes via facsimile.

9. A method of telephone call tracking and billing reporting, comprising the steps of:

answering an incoming call and establishing a two-party connection with a caller;

verifying that the caller is a valid user;

recalling stored report criteria preselected by said valid user, in response to a first report request received from said a user;

receiving first report data from said user corresponding to said preselected report criteria;

requesting a first report to be delivered to said user;

storing preselected report criteria and said first report data;

terminating the incoming call;

receiving said request for said first report delivery to said user;

generating a report in a preselected format;

recalling a preselected telephone number for report delivery from said user;

establishing a connection with said telephone number for report delivery;

transmitting said report via said telephone number for report delivery;

monitoring the connection with said telephone number for report delivery; and documenting report delivery when finished transmitting said report and terminating said call.

10. The method of claim 9 further including receiving a second report request from said user and terminating the incoming call if no second report request is desired by said user.

11. The method of claim 9 wherein the step of verifying that the caller is a valid user includes comparing and matching a user personal identification number with a stored list of valid personal identification numbers.

12. The method of claim 9 wherein said preselected format includes an electronic file.

13. The method of claim 9 wherein said preselected format includes a printed medium.

14. The method of claim 12 wherein the step of transmitting includes a modem.

15. The method of claim 14 wherein the step of transmitting further includes via the internet.

16. The system of claim 12 wherein the step of transmitting further includes via facsimile.

17. A telephone call tracking and billing system comprising:

at least one telephone device to be used by a subscriber so as to establish a telephony type communication;

a processor assembly operatively associated with said telephone device;

said processor assembly structured to verify that the subscriber associated with a particular one of said telephony type communications is a valid user;

said processor assembly structured to store documentation criteria corresponding said valid user;

said processor assembly further structured to identify said valid user and to recall said documentation criteria in connection with said particular telephony type communication;

said processor assembly structured to receive and store documentation data from said valid user corresponding said documentation criteria for said particular telephony type communication;

said documentation criteria including a reason for said particular telephony type communication, said reason for said particular telephony type communication comprising documentation data stored by said processor assembly in association with said particular telephony type communication;

said documentation criteria further includes at least one identifier for said particular telephony type communication, said identifier for said particular telephony type communication comprising documentation data stored by said processor assembly in association with said particular telephony type communication and structured to distinguish said particular telephony type communication from other telephony type communications; and said processor assembly structured to monitor a duration of said particular telephony type communication.

18. A telephone call tracking and billing system as recited in claim 17 wherein said processor assembly is structured to report a duration and said documentation data associated with said particular telephony type communication.

19. A telephone call tracking and billing system as recited in claim 17 wherein said particular telephony type communication comprises an inbound person to person telephone call.

20. A telephone call tracking and billing system as recited in claim 17 wherein said particular telephony type communication comprises an outbound person to person telephone call.

21. A telephone call tracking and billing system as recited in claim 17 wherein said particular telephony type communication comprises a facsimile transmission.

22. A telephone call tracking and billing system as recited in claim 17 wherein said identifier comprises a telephone number being called by said valid user as said particular telephony type communication.

23. A telephone call tracking and billing system as recited in claim 22 wherein said identifier further comprises a date of said particular telephony type communication as determined by said processor assembly.

24. A telephone call tracking and billing system as recited in claim 17 wherein said reason for said particular telephony type communication comprises a reason code inputted by said valid user.

25. A telephone call tracking and billing system as recited in claim 24 wherein said processor assembly is structured to store a plurality of said reason codes defined by said valid user so as to permit said user to select at least one of said reason codes in order to define said reason for said particular telephony type communication.

26. A telephone call tracking and billing system as recited in claim 17 wherein said processor assembly is structured to be remotely and affirmatively accessed by said valid user.

27. A telephone call tracking and billing system as recited in claim 17 wherein said processor assembly is automatically associated with said at least one telephone device.

* * * * *